No. 11,742. Reissued May 23, 1899.

S. BORCHARDT.

LAMB'S WOOL OR SLIPPER SOLE.

(Application filed Oct. 1, 1897.)

Witnesses:
A. M. Burke
J. A. Graves

Inventor:
Samuel Borchardt
By Philipp, Phelps & Sawyer
Attys

UNITED STATES PATENT OFFICE.

SAMUEL BORCHARDT, OF NEW YORK, N. Y.

LAMB'S-WOOL OR SLIPPER SOLE.

SPECIFICATION forming part of Reissued Letters Patent No. 11,742, dated May 23, 1899.

Original No. 539,337, dated May 14, 1895. Application for reissue filed October 1, 1897. Serial No. 653,768.

*To all whom it may concern:*

Be it known that I, SAMUEL BORCHARDT, of New York city, in the county and State of New York, have invented a new and Improved Lamb's-Wool or Slipper Sole, of which the following is a full, clear, and exact description.

My invention relates to an improvement in lamb's-wool or slipper soles, and especially to an improvement in that class of soles adapted to be attached to an upper made by crocheting or equivalent means; and the object of this invention is to provide such a sole which will not require binding, and in which the bottom will be in one piece, and in which the stitching ordinarily employed for attaching the sole to the soft upper surface will be entirely omitted.

Another object of the invention is to provide the margin of the sole with a draw-string whereby it may be crimped around the upper surface of the sole, forming an upwardly-extending flange for attachment to the upper, the flange being materially strengthened by the aforesaid draw-string, the string likewise being a medium for attachment between the upper and the sole, if desired.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
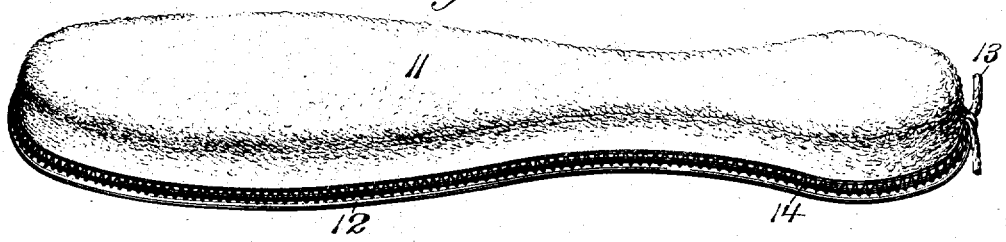
Figure 2:
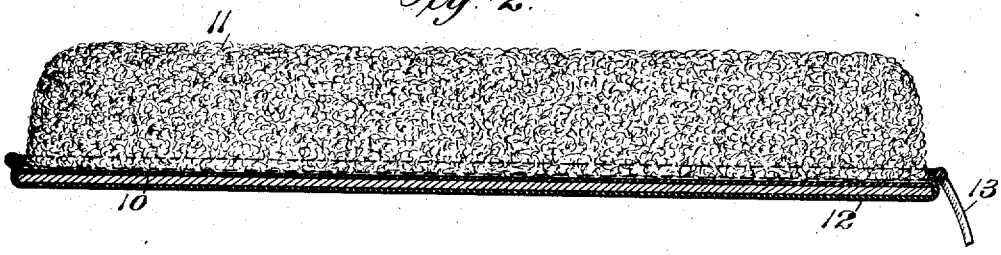
Figure 3:
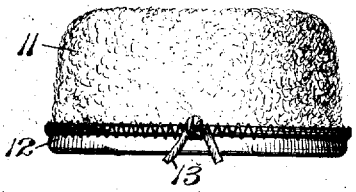
Figure 4:
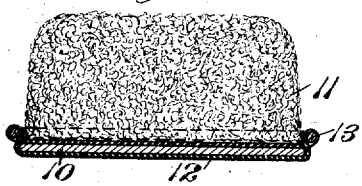
Figure 5:
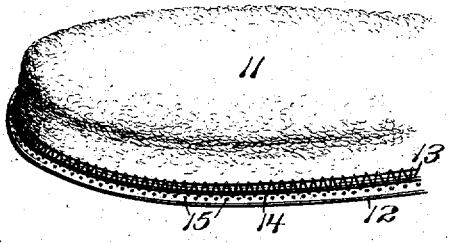

Figure 1 is a perspective view of the improved sole. Fig. 2 is a longitudinal sectional view thereof. Fig. 3 is a view of the heel portion of the sole. Fig. 4 is a transverse section through the sole; and Fig. 5 is a perspective view of the toe portion of the sole, illustrating a slight modification in its construction.

The sole consists of a stiffening-strip 10, of pasteboard, cork, or other desired material, and an upper facing 11, of lamb's wool, canton-flannel, or other soft material, which is usually firmly cemented to the stiffening-strip 10. The material of the sole is completed by the addition of a bottom strip 12, preferably made of leather and in one piece; but it may be made from other suitable material.

All of the strips are given the necessary shape; but the bottom strip 12 is wider than the others and is provided along its margin with a draw-string 13. The bottom or leather strip is cemented or otherwise secured to the stiffening-strip 10, and by manipulating the draw-string, the ends of the string preferably meeting at the heel, the marginal portion of the bottom or leather strip will be gathered upward around the finishing and inner strip, completely concealing and protecting their marginal surfaces.

The draw-string may be placed in a hem formed in the margin of the bottom strip of the sole, or, as illustrated in the drawings, the string may be passed through the loops 14, made by proper stitches properly placed, or any equivalent of the stitches may be employed as a conductor for the string. If in practice it is found desirable, a series of apertures 15 may be made in the bottom or leather strip adjacent to the draw-string, as shown in Fig. 5, in order that a comparatively blunt needle may be passed through these apertures in attaching the upper to the sole.

It is evident that the upper may be secured to the sole by stitching or otherwise attaching it to the draw-string and that the marginal portion of the sole is materially strengthened by the aforesaid draw-string, enabling the upper to be more securely and readily attached to the sole than under the ordinary construction of the latter article. Furthermore, it is obvious that there is no necessity of stitching through the bottom of the sole, which stitching is usually quickly worn out, and the sole separates from the upper or from its several parts.

Having thus described my invention, I claim as new and desire to secure by Letters Patent—

1. A lamb's-wool or slipper sole having its bottom section wider than the other sections and provided with a marginal draw-string, as and for the purpose set forth.

2. A lamb's-wool or slipper sole having its bottom strip or section wider than the other portions thereof, carried upward and provided with a marginal draw-string, the said string serving to shape the sole, and likewise serving as a reinforcement therefor at the point where the upper is to be attached, as and for the purpose specified.

3. A lamb's-wool or slipper sole, comprising an upper strip of a soft material, a stiffening-strip secured to the upper strip, and a fastening-strip of leather or like material cemented to the stiffening-strip, the finishing or bottom strip being wider than the other strips and provided with a draw-string at its margin, whereby the finishing-strip of the sole may be drawn upward at its margin, concealing the corresponding margins of the other strips forming the sole, and whereby also the margin is reinforced and need not be attached to the remaining portion of the sole, but presents a suitable surface for the attachment of the upper, as and for the purpose set forth.

4. A lamb's-wool or slipper sole having its bottom strip wider than the other portions thereof, carried upward and provided on the outer face of such upwardly-carried portion with means for the attachment of an upper, such means consisting of a cord laid along and exposed on such outer face and so connected therewith as to permit of the introduction between it and such outer face of stitching by which the upper is attached to the sole, whereby such cord is concealed by the upper, substantially as described.

SAMUEL BORCHARDT.

Witnesses:
J. J. KENNEDY,
T. F. KEHOE.